US007456397B2

(12) United States Patent
Hartmer et al.

(10) Patent No.: US 7,456,397 B2
(45) Date of Patent: Nov. 25, 2008

(54) ION FRAGMENTATION BY ELECTRON TRANSFER IN ION TRAPS

(75) Inventors: Ralf Hartmer, Hamburg (DE); Andreas Brekenfeld, Bremen (DE)

(73) Assignee: Bruker Daltonik GmbH, Bremen (DE)

( * ) Notice: Subject to any disclaimer, the term of this patent is extended or adjusted under 35 U.S.C. 154(b) by 222 days.

(21) Appl. No.: 11/343,235

(22) Filed: Jan. 30, 2006

(65) Prior Publication Data

US 2006/0186331 A1 Aug. 24, 2006

(30) Foreign Application Priority Data

Jan. 31, 2005 (DE) ...................... 10 2005 004 324

(51) Int. Cl.
*B01D 59/44* (2006.01)

(52) U.S. Cl. ...................... 250/292; 250/281; 250/285; 250/293

(58) Field of Classification Search ................. 250/281, 250/285, 292, 293
See application file for complete search history.

(56) References Cited

U.S. PATENT DOCUMENTS

| | | | | |
|---|---|---|---|---|
| 7,196,326 B2 * | 3/2007 | Franzen et al. | 250/288 |
| 2002/0162958 A1 * | 11/2002 | Yoshinari et al. | 250/292 |
| 2002/0175279 A1 * | 11/2002 | Hager | 250/282 |
| 2003/0071206 A1 * | 4/2003 | Belov et al. | 250/282 |
| 2003/0155498 A1 * | 8/2003 | Kato | 250/281 |
| 2004/0159785 A1 | 8/2004 | Kato | |

FOREIGN PATENT DOCUMENTS

| | | |
|---|---|---|
| DE | 103 25 582 A1 | 1/2005 |
| GB | 2415087 A | 12/2005 |
| WO | WO 2005/090978 A1 | 9/2005 |
| WO | WO 2006/042187 A2 | 4/2006 |

OTHER PUBLICATIONS

Stephenson, et al "Adaptation of the Paul Trap for the study of the reaction of multiply charged cations with singly charged anions" International Journal of Mass Spectrometry and Ion Processes 162 (1997) 89-106.*

Coon, et al., "Anion dependence in the partitioning between proton and electron transfer in ion/ion reactions", International Journal of Mass Spectrometry, vol. 236, pp. 33-42, Elsevier B.V., 2004.

Coon, J.J., et al., "Anion Dependence in the Partitioning Between Proton and Electron Transfer in Ion/Ion Reactions", International Journal of Mass Spectrometry, vol. 236, No. 1-3, Aug. 2004, pp. 33-24.

Stephenson, J.L., Jr., et al., "Adaptation of the Paul Trap for Study of the Reaction of Multiply Charged Cations With Singly Charged Anions", International Journal of Mass Spectrometry, vol. 62, No. 1-3, Mar. 1997, pp. 89-106.

* cited by examiner

*Primary Examiner*—Jack I. Berman
*Assistant Examiner*—Michael Maskell
(74) *Attorney, Agent, or Firm*—The Law Offices of Paul E. Kudirka

(57) ABSTRACT

The invention relates to a method and instrument for the fragmentation of large molecular analyte ions, preferably biopolymer ions, by reactions between multiply charged positive analyte ions and negative reactant ions in RF quadrupole ion traps. Some of these reactions involve electron transfer reactions with subsequent dissociation of the biopolymer analyte ions, and some involve the loss of a proton, leading to stable product ions. The invention can use any type of ion traps, particularly three-dimensional RF quadrupole ion traps, for the reactions between positive and negative ions. The fragmentation yield can be increased because ions that remain stable as radical cations after transfer of an electron are further fragmented by collisionally induced fragmentation, forming fragment ions that are typical of electron transfer, and not those typical of collisionally induced fragmentation. The invention preferentially introduces positive ions and negative ions into the ion trap sequentially through the same aperture.

15 Claims, 1 Drawing Sheet

ION FRAGMENTATION BY ELECTRON TRANSFER IN ION TRAPS

FIELD OF THE INVENTION

The invention relates to a method and instrument for the fragmentation of large molecular analyte ions, preferably biopolymer ions, by reactions between multiply charged positive analyte ions and negative reactant ions in RF quadrupole ion traps.

BACKGROUND OF THE INVENTION

In the recently published paper "Anion dependence in the partitioning between proton and electron transfer in ion/ion reactions" by J. J. Coon et al., Int. J. Mass Spectrom. 236, 33-42, (2004), the reactions of multiply charged positive ions (cations) with specific classes of negative ions (anions) in linear ion traps are analyzed. Linear ion traps (also termed 2D ion traps, because the electric fields in the interior only change in two dimensions) comprise four rods, to which an RF voltage (radio frequency voltage) is applied, with end electrodes which repel the ions. The authors describe which types of anion lead only to a simple deprotonation ("charge stripping") of organic biopolymers, and which types of anions primarily result in electron transfer, which leads to subsequent cleavages of the backbone of these biopolymers with high yield (ETD=electron transfer dissociation). The fragment ions here belong to the so-called C and Z series, and are therefore very different to the fragment ions of the B and Y series, which are obtained by collisionally induced fragmentation (CID). The fragments of the C and Z series have advantages for the identification and determination of the amino acid sequence from the mass spectrometric data.

The authors' linear ion trap was specially equipped for the simultaneous storage of positive and negative ions. It had grids at both ends, which were operated with RF voltages and could therefore repel ions of both polarities. In addition, the positive ions were introduced from one end, the negative ions from the other end, and could initially be kept apart in the linear ion trap by special measures which generated an axial DC potential profile before the reaction was started by switching off the DC potential profile. The setup of the linear ion trap was therefore much more complex than that of commercial instruments.

The authors report in the cited paper that acquainted well-known scientists had not been able to detect any electron transfer, or the associated fragmentation, in 3D ion traps, even in reactions with the same combinations of cations and anions, which would have led to electron transfer in linear ion traps. The positive ions were introduced into the 3D ion trap in the usual way through an aperture in one of the two end caps, and the negative ions through an aperture in the ring electrode. The authors speculate in a separate section 3.7 of the cited article (titled "3D versus 2D traps for ETD") about the reasons why electron transfer cannot occur in 3D ion traps. One of the explanations is that the ions in a 3D ion trap are confined from all sides by pseudopotential fields, whereas in 2D ion traps they would have freedom of movement in one direction. So electron transfer dissociation (ETD) in 3D ion traps was not only not detected, despite searching, but authors who are very experienced in this field, and must be taken seriously, are also discussing the fact that electron transfer cannot occur in 3D ion traps and why this is so.

Three-dimensional ion traps (3D ion traps) according to Wolfgang Paul comprise a ring electrode and two end cap electrodes. The ring electrode is usually supplied with a one-phase RF voltage while the end cap electrodes are basically grounded but other modes of operation are also possible. In the interior of the ion trap, ions can be stored in the quadrupole RF field. In principle, 3D ion traps are better suited for reactions between positive and negative ions, because positive and negative ions can be stored simultaneously without any redesign of the trap, in contrast to commercial linear 2D ion traps with repelling end electrodes which repel only either positive or negative ions and cannot store both types of ions simultaneously without some complicated redesign.

The ion traps can be used as mass spectrometers by mass-selectively ejecting the stored ions mass by mass and measuring them with secondary-electron multipliers. Several different methods of ion ejection have been described, but they will not be discussed further here. More exact the word "mass" should be read by "mass-to-charge-ratio m/z" throughout this description, because only the mass m divided by the number z of elementary charges is effective in all kinds of mass spectrometry. Sometimes the mass-to-charge-ratio m/z is called "specific mass", meaning the charge specific mass or charge related mass.

The maximum RF voltage at the ring electrode is very high, between 15 and 30 kilovolts (peak-to-peak) for customary ion trap mass spectrometers. The frequency is around one megahertz. In the interior of the 3D ion trap, essentially an RF quadrupole field is generated, which oscillates with the RF voltage and drives the ions above a threshold mass to the center, causing these ions to execute so-called secular oscillations in this field. The restoring forces in the ion trap are usually described by a so-called pseudopotential, which is determined by a temporal averaging of the forces of the real potential on the oscillating ions. The pseudopotential increases uniformly and quadratically in all directions and is effective for both polarities of ions. The ions oscillate in this "well" of the pseudopotential.

The ions can be generated in the interior or be introduced from outside. A collision gas in the ion trap ensures that the oscillations of the ions which are present at the onset are decelerated in the well of the pseudopotential; the ions then collect as a small cloud in the center of the ion trap. The diameter of the cloud in normal ion traps with normal ion fillings of a few thousand ions is around one millimeter; it is determined by an equilibrium between the restoring force of the pseudopotential and the repelling Coulomb forces between the ions. The internal dimensions of commercially available 3D ion traps are usually characterized by distance between the end caps of around 14 millimeters; the diameter of the ring is around 14 to 20 millimeters.

Ion trap mass spectrometers have properties enabling them for many types of analysis. In particular, selected ion species (so-called "parent ions") can be isolated and fragmented in the 2D or 3D ion trap. Isolation of an ion species means that all ion species which are not of interest are removed from the ion trap by strong resonant excitations or other measures, so that only the parent ions remain. The fragmentation is brought about by a weak resonant excitation of the ion oscillations with a dipolar alternating voltage across the two end cap electrodes of the 3D ion trap (or across two electrode rods in case of 2D ion traps), which leads to many collisions with the collision gas, without removing the ions from the ion trap. The ions can collect energy in the collisions, which finally leads to the decomposition of the ions. For the fragmentation, one normally starts with doubly charged parent ions. In the prior art of ion traps, the ions have only been fragmented by such collisions with collision gas (CID=collision induced dissociation). The spectra of these fragment ions are called "daughter ion spectra" or "fragment ion spectra" of the selected parent ions concerned. Structures of the fragmented ions can be read off from these daughter ion spectra; it is therefore possible (although difficult) to determine the sequence of the amino acids of a peptide from these spectra. "Granddaughter ion spectra" can also be measured as fragment ion spectra of selected, isolated and fragmented daughter ions.

A widely used method of ionizing large biomolecules is to use electrospray ionization (ESI), which ionizes ions at atmospheric pressure outside the mass spectrometer. These ions are then introduced into the vacuum of the mass spectrometer, and from there into the ion trap, by means of inlet systems of a known type. RF ion guides are usually used to transfer the ions within the vacuum system, these ion guides usually taking the form of hexapole or octopole rod systems.

This ionization by electrospray ionization generates hardly any fragment ions. The ions are mostly those of the protonated molecule. But it is the strength of electrospray ionization that lots of multiply charged ions of the molecules are formed (doubly and triply charged ions). The lack of almost any fragmentation during the ionization process limits the information from the mass spectrum to the molecular weight; there is no information concerning internal molecular structures that can be used for further identification of the substance present. This information can only be obtained by acquiring fragment ion spectra.

A new method for fragmenting biomolecules, predominantly peptides and proteins, was described some years ago in ion cyclotron resonance or Fourier transform mass spectrometry. It consists in capturing low kinetic energy electrons from usually doubly charged ions. The electron capture mechanism leads to breaks of the backbone of the usually chain-shaped molecules. The method is called ECD (electron capture dissociation). If the molecules were doubly charged, one of the two fragments created remains as an ion. The fragmentation follows very simple rules (for specialists: there are essentially only an exceptionally large number of C cleavages, a small number of Z cleavages and very few Y cleavages between the amino acids of a peptide), so that it is relatively simple to elucidate the structure of the molecule from the fragmentation pattern. It is often very simple to read off the sequence of peptides or proteins directly from the mass differences of the exceptionally large C fragment ion signals; in contrast to the evaluation of collisional fragmentation spectra. It is significantly easier to interpret these ECD fragment spectra than CID fragment spectra. In addition, ECD fragment ions do not lose side chains like those formed by post translational modifications, whereas CID spectra do regularly lose these side chains. Thus the ECD spectra contain complementary information to that of CID spectra; it is particularly useful to have both types of fragment spectra available for evaluation.

It is also possible to fragment triply charged ions in this way, but the method is particularly impressive when used with doubly charged ions. If electrospray ionization is applied to peptides, the doubly charged ions are generally also the most prevalent ions. Electrospray ionization is a method of ionization that is very frequently used for biomolecules for the purpose of the mass spectrometric analysis in ion traps.

Fragmentation by electron transfer in reactions between multiply charged cations and suitable anions, as discussed above, would be a suitable alternative to electron capture dissociation (ECD), which is very difficult to carry out in ion traps, since the RF fields scarcely permit the entry of low-energy electrons. Fragmentation by electron transfer produces fragments which are very similar to those produced by electron capture.

SUMMARY OF THE INVENTION

The invention provides a method to perform fragmentation of multiply charged analyte ions by electron transfer in reactions with suitable negative reactant ions in a 3D RF ion trap by simply introducing both types of ions sequentially into the 3D ion trap. The 3D ion trap is particularly suited for such reactions without special measures which go beyond the usual operation of the 3D ion trap analyzer inside the mass spectrometer.

The invention provides furthermore a 2D or 3D ion trap mass spectrometer for the acquisition of fragment spectra with fragmentation of multiply charged analyte ions by electron transfer whereby the positive and negative ions are introduced through the same aperture into the ion trap.

Suitable negative ions are, for example, those of fluoranthene, fluorenon, anthracene, or other polyaromatic compounds of low electron affinity.

The invention prefers to introduce positive and negative ions sequentially through the same introduction aperture, for instance, through the same aperture in one of the two end caps in a 3D ion trap. In our experiments, this type of introduction showed best results. This type of introduction is particularly preferred because it does not interfere with the conventional operation of an ion trap mass spectrometer. It may even be a preferred introduction path for 2D ion trap mass spectrometers. For 3D ion trap mass spectrometers, it may be expected that an introduction via different apertures, for example through two apertures in opposite end caps, can also be successful; this may, however, not be true for all types of ion introduction and all types of introduction apertures. It seems quite possible that the lack of success for such reactions within 3D ion traps reported in the paper cited above can be attributed to the type of ion introduction. Introducing the positive and the negative ions to an ion trap (possibly also a 2D ion trap) through the same aperture therefore seems to be a particularly favorable embodiment.

The preferred embodiment of the method uses a 3D ion trap. The reactions between the stored positive and negative ions occur in the 3D ion trap automatically and without any special activation. In contrast to the literature cited above, not only deprotonization reactions are observed, but also—depending on the type of negative ions—very large numbers of electron transfer reactions. The electron transfer reactions lead in turn either to the desired immediate fragmentation or to the formation of radical cations, which do not have a reduced number of protons, but have acquired an electron. These radical cations remain stable in the ion trap over a long period. As usual, the 3D ion trap here is filled with a collision gas (also called damping gas) to damp the ion oscillations. In particular, the 3D RF ion trap can also be operated as a mass analyzer to analyze the fragment ions.

If large numbers of stable radical cations are formed in the reactions between multiply charged positive ions and negative ions in the RF ion trap, these radical cations can additionally be fragmented by collisions with collision gas. This creates types of fragment ions which resemble the fragment ions produced by electron transfer; not the types which are obtained by collisionally induced fragmentation of non-radical ions. The fragmentation of the radical cations can be induced by a mass-specific excitation with a weak resonant dipolar alternating voltage, as is usually used for collisionally induced fragmentation. This alternating excitation voltage can be applied as the negative ions are being introduced or later, e.g., after the reactions have finished.

The radical cations have the same number of charges as the deprotonated ions, but differ from the deprotonated ions by the mass of one proton and one electron. The fragmentation of these radical cations by collisions with damping gas seems to require much less energy than normal collisionally induced fragmentation. If a mixture of deprotonated ions and radical cations of the substance being analyzed is present, then a very weak resonant excitation is sufficient to generate the electron transfer fragment ions without significant numbers of the deprotonated ions being fragmented.

A favorable method generates a mixture of positive ions including the analyte ions in a first step, introduces the ions into the 3D RF ion trap in a second step, then isolates, in a third step, the ions of a selected higher charge state of the analyte ions (for example, triply charged ions) which are to be fragmented in the ion trap, and only then generates, in a fourth step, and introduces, in a fifth step, the negative ions. In a sixth step, the fragment ions are analyzed. The electron transfer reactions between the positive and negative ions occur automatically by the introduction of the negative ions without any human or control software interaction or activation, i.e., without any additional method step.

If the positive and negative ions are introduced into the ion trap through the same introduction aperture, it is advantageous to guide the ions to this aperture by an RF ion guide, in which ions of both polarities can be guided. This ion guide path can, in particular, include a normal quadrupole ion filter, with which the suitable positive analyte ions, and then the suitable negative reactant ions, can be filtered out before the ions are introduced into the ion trap.

It is advantageous if the positive analyte ions are generated in an electrospray ion source since this creates an especially large number of doubly and triply charged ions. The triply charged ions, in particular, lead to large numbers of electron transfer reactions with subsequent fragmentation of the doubly charged radical cations. These radical cations mostly decompose further on their own. The electrospray ion source is regularly located outside the vacuum system at atmospheric pressure, and the ions are guided through capillaries into the vacuum system. The negative ions can favorably be generated in a chemical ionization source for negative ions; this ion source can preferably be located in the vacuum system of the mass spectrometer. A favorable mass spectrometer consists of ion sources for multiply charged positive analyte ions and negatively charged reactant ions, an ion guide for both types of ions, and an 3D ion trap.

Coming from their respective ion sources, the positive and the negative ions can preferably be introduced into the 3D ion trap sequentially through an ion switch into the part of the RF ion guide that is used jointly by both.

DETAILED DESCRIPTION

Figure 1:
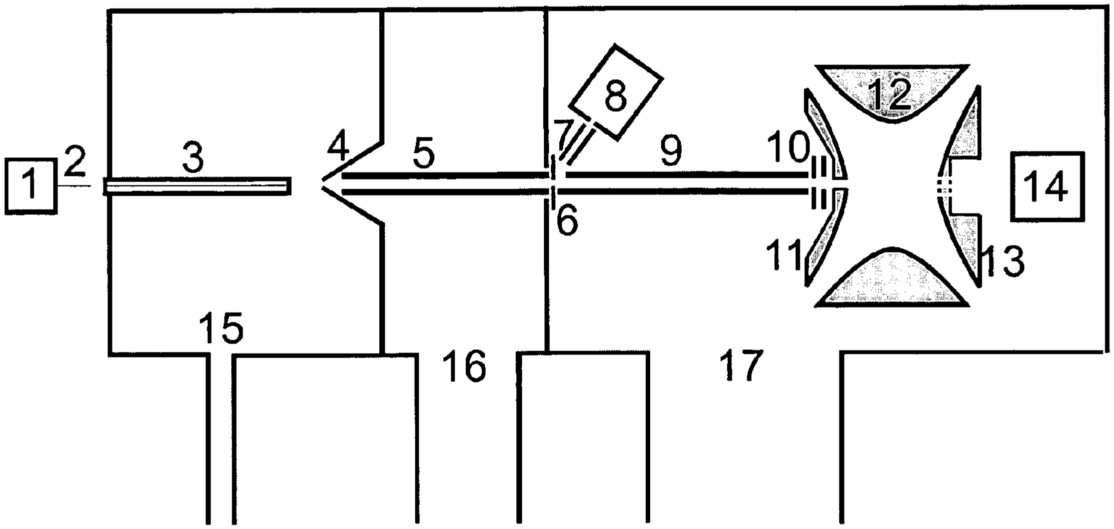
FIG. 1 represents a schematic array of an ion trap mass spectrometer to carry out a method according to this invention, with an electrospray ion source (1, 2), an ion source for negative ions (8) and a 3D ion trap with end cap electrodes (11, 13) and ring electrode (12). The ion guide (9), which takes the form of an octopole rod system here, can guide both positive and negative ions to the ion trap.
Figure 2:
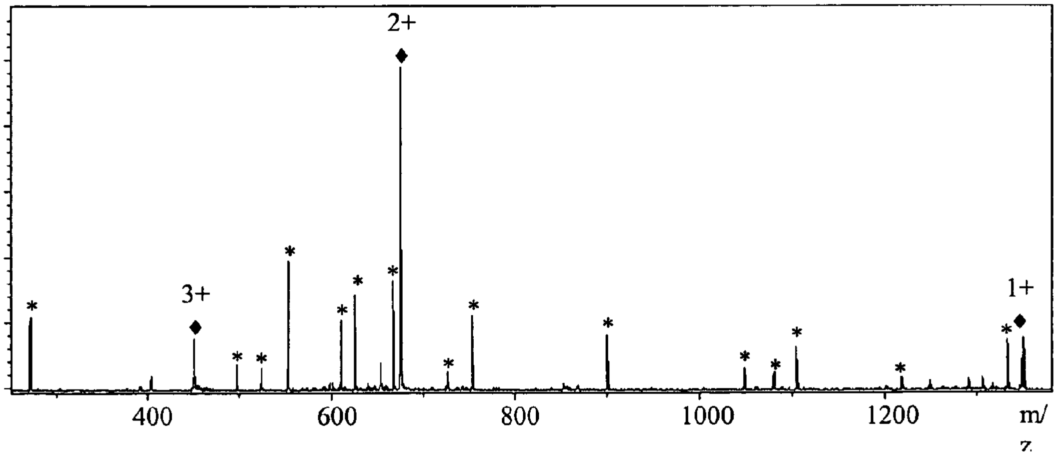
FIG. 2 illustrates a daughter ion spectrum of the triply charged ions of the substance P, which was obtained according to this invention by reactions with negative ions of fluoranthene. The fragment ions are labeled with asterisks.

A favorable embodiment of an ion trap mass spectrometer according to this invention and for carrying out a method according to the invention is shown schematically in FIG. 1. Here, an electrospray ion source (1) with a spray capillary (2) outside the mass spectrometer is used to ionize biomolecules. It will be assumed here that a mixture of digest peptides of a relatively large protein is to be analyzed. The ions are guided in the usual way via an inlet capillary (3) and a skimmer (4), with the ion guides (5) and (9), through the pressure stages (15), (16), (17) to the 3D ion trap with end cap electrodes (11 and 13) and ring electrode (12), where they are captured in the usual way. The ion guides (5) and (9) comprise parallel rod pairs, across which the phases of an RF voltage are alternately applied. They can take the form of a quadrupole, hexapole or octopole rod system.

A first mass spectrum, obtained by resonant excitation of the ions with mass-selective ejection and measurement in the ion detector (14), provides an overview of the digest peptides. If it is now intended to analyze one or more peptides for their sequence of amino acids, the triply charged ions of this peptide are isolated by usual methods; this means that the ion trap is first overfilled, and then all ions that are not triply charged ions of this peptide are ejected from the ion trap. The triple charge is recognized by the spacing of the isotope lines. For triply charged ions this is exactly ⅓ of an atomic mass unit. If triply charged ions are not available in sufficient numbers, the doubly charged ions can also be used.

These multiply charged ions isolated within the ion trap are damped for a short time of a few milliseconds by the ever-present collision gas into the center of the trap. There they form a small cloud of around one millimeter in diameter.

After this, the negatively charged reactant ions are added. These ions are generated in a separate ion source (8) by negative chemical ionization, and are guided via a small ion guide (7) to an ion switch, where they are threaded into the commonly used ion guide (9) to the ion trap (11, 12, 13). In the embodiment shown here, the ion switch simply comprises a split apertured diaphragm (6), across whose two halves two suitable DC potentials can be applied, and a shortening of two rods of the rod-type ion guide (9). It is particularly favorable for this very simple type of ion switch if the ion guide takes the form of an octopole or hexapole system. This ion switch can allow the ions of the electrospray ion source (1, 2) to pass unhindered when there are suitable voltages across the half diaphragms. With other voltages, the negative ions from the ion source (8) are reflected into the ion guide (9). The ions reach the ion trap via this ion guide (9), where they are transported and stored in the usual way by means of an injection lens (10). They react here immediately (within a few milliseconds) with the positive ions.

This type of ion switch is very simple and may even be retrofitted (including an ion source for negative ions) in existing instruments. Other types of ion switch can also be used, of course. U.S. Pat. No. 6,737,641 B2 (Y. Kato), for example, illustrates an ion switch, but it seems to be very complicated and expensive compared to the ion switch described above, and fundamentally changes the type of the instrument.

Since the transfer of an electron generally also causes stable radical cations to be formed, which do not decompose immediately, a weak dipolar alternating excitation voltage for resonant excitation of these radical cations is applied across both end caps (11, 13) of the ion trap. The frequency for this alternating excitation voltage can be calculated from the known mass of these radical cations and their known charge. This excitation voltage increases the yield of fragment ion.

Threading both the positive and the negative ions through the same entrance aperture of the ion trap means that normal operation of the ion trap, with filling and mass-selective ejection of the ions toward the detector (14) is not affected.

Threading the ions in through the same entrance aperture can also be beneficial for the reactions between positive and negative ions, as can be indirectly concluded from the above-described unsuccessful experiments of other scientists. Threading the ions in like this can therefore also be used for linear ion traps, and can bring about an improvement in the yield there.

Various methods are known for calculating the times of an optimum filling of the ion trap, but they will not be discussed further here. Controlling the filling times in the right way generates optimum filling, so that the space charge stops just short of deteriorating the spectrum acquisition by mass-selective ejection of the ions. Essentially the number of charges inside the ion trap is controlled. Other parameters are also important for an optimum response when acquiring spectra, but they will not be discussed in detail here. For the filling with negative ions, on the other hand, it is only necessary to determine the optimum filling time once, since roughly the same number of negative ions is always required for an optimum reaction with the fixed number of positive ions.

The mass spectra obtained in this way are very similar to the mass spectra obtained from fragmentations produced by the capture of low-energy ions (electron capture dissociation). For proteins and peptides they illustrate primarily the C series of fragment ions, and are therefore eminently suitable for determining the amino acid sequence.

This method can then be repeated for other peptides from the mixture. This produces comprises a very certain identification of the protein. It is even possible to determine differences between the protein analyzed and those from protein sequence databases. These differences resulting from post-translational modifications of the proteins are generally of particular interest.

With knowledge of this invention, those skilled in the art can also create further methods which extend and complete the knowledge about structures of the substances analyzed. For example, from the fragment ions produced in this way it is possible to generate granddaughter ions again by collisionally induced fragmentation. All these solutions are intended to be included in the basic idea of the invention.

What is claimed is:

1. Method for the fragmentation of multiply charged positive analyte ions by electron transfer in reactions with negative ions having an electron affinity lower than an electron affinity of the positive analyte ions, wherein the reactions take place in a 3D RF ion trap and wherein the positive and negative ions are introduced into the 3D RF ion trap sequentially through one introduction aperture.

2. Method according to claim 1, wherein the positive ions are first introduced into the 3D RF ion trap, then ions of a selected higher charge state which are to be fragmented are isolated in the 3D ion trap, and only then are the negative ions introduced.

3. Method according to claim 1, wherein the ions of both polarities are introduced into the 3D ion trap via an RF ion guide in front of the introduction aperture.

4. Method according to claim 3, wherein in the RF ion guide, a quadrupole ion filter filters out the suitable positive ions and then the suitable negative ions before the respective ions are introduced into the 3D RF ion trap.

5. Method according to claim 1, wherein the positive ions originate from an electrospray ion source, whereas the negative ions are generated in a chemical ionization source for negative ions.

6. Method according to claim 3, wherein the positive and the negative ions coming from their respective ion sources are brought together by an ion switch at the beginning of the RF ion guide.

7. Method according to claim 1, wherein radical cations created from positive ions by transfer of an electron are fragmented by collisions with collision gas to increase the yield of typical electron transfer fragment ions.

8. Method according to claim 7, wherein the collisionally induced fragmentation of the radical cations is produced by excitation with a dipolar alternating voltage.

9. Method according to claim 8, wherein the excitation with the dipolar alternating voltage applied is weaker than a dipolar alternating voltage used for collisionally induced fragmentation of multiply charged positive ions without a prior electron transfer reaction.

10. Ion trap mass spectrometer for the fragmentation of ions by electron transfer in reactions between multiply charged positive ions and negative ions, with an RF quadrupole ion trap, a first ion source to generate multiply charged positive ions, a second ion source to generate negatively charged ions of one of the group consisting of fluoranthene, fluorenon, anthracene, and polyaromatic compounds of low electron affinity, a first ion guide to transfer ions from the first ion source to a third ion guide, a second ion guide to transfer ions from the second ion source to the third ion guide, wherein both ion species pass through the third ion guide to the RF quadrupole ion trap.

11. Ion trap mass spectrometer according to claim 10 wherein the third ion guide comprises an RF ion guide.

12. Ion trap mass spectrometer according to claim 11, wherein there is an ion switch at the beginning of the third ion guide, and the ion switch threads the ions of different origins into the third ion guide.

13. Ion trap mass spectrometer according to claim 12 wherein the ion switch comprises a split apertured diaphragm at the beginning of the third ion guide; the third ion guide comprises rods, and two adjacent rods of the third ion guide toward the split apertured diaphragm are shortened for threading in the ions.

14. Ion trap mass spectrometer according to claim 10, wherein there is a quadrupole ion filter in the RF ion guide.

15. Ion trap mass spectrometer for the fragmentation of ions by electron transfer in reactions between multiply charged positive ions and negative ions, comprising a) an RF quad rupole ion trap, b) an ion source to generate multiply charged positive ions, c) an ion source to generate negatively charged ions of one of the group consisting of fluoranthene, fluorenon, anthracene, and polyaromatic compounds of low electron affinity, d) an ion guide to transfer ions to the RF quadrupole ion trap, e) and an ion switch feeding sequentially either positive ions or negative ions into the ion guide.

* * * * *